US012496239B2

(12) United States Patent
Kossoff et al.

(10) Patent No.: US 12,496,239 B2
(45) Date of Patent: Dec. 16, 2025

(54) TRANSPORT DEVICE

(71) Applicants: Andrew Kossoff, West Des Moines, IA (US); Allen Rodriguez, Pleasant Hill, IA (US)

(72) Inventors: Andrew Kossoff, West Des Moines, IA (US); Allen Rodriguez, Pleasant Hill, IA (US)

( * ) Notice: Subject to any disclaimer, the term of this patent is extended or adjusted under 35 U.S.C. 154(b) by 157 days.

(21) Appl. No.: 18/315,915

(22) Filed: May 11, 2023

(65) Prior Publication Data

US 2023/0363960 A1 Nov. 16, 2023

Related U.S. Application Data

(60) Provisional application No. 63/340,802, filed on May 11, 2022.

(51) Int. Cl.

*A61G 1/013* (2006.01)
*A61G 1/01* (2006.01)
*A61G 1/044* (2006.01)
*A61G 1/048* (2006.01)
*A61G 1/04* (2006.01)

(52) U.S. Cl.

CPC ............... *A61G 1/013* (2013.01); *A61G 1/01* (2013.01); *A61G 1/044* (2013.01); *A61G 1/048* (2013.01); *A61G 1/04* (2013.01)

(58) Field of Classification Search

CPC .......... A61G 1/013; A61G 1/01; A61G 1/044; A61G 1/048; A61G 1/04
USPC ............................ 5/81.1 T, 81.1 R, 625, 627
See application file for complete search history.

(56) References Cited

U.S. PATENT DOCUMENTS 2,489,828 A * 11/1949 Springer .................. A61G 1/01 5/628
2,788,530 A * 4/1957 Ferguson ................. A61G 1/01 5/628
4,124,908 A * 11/1978 Burns ................... A61F 5/3776 5/628
4,671,393 A * 6/1987 Rainey ...................... A45C 3/10 383/110
4,905,990 A * 3/1990 DeSantis .................. A63B 6/00 482/148
5,121,514 A * 6/1992 Rosane ..................... A61G 1/01 5/628
5,189,746 A * 3/1993 Horie ........................ A61G 1/01 5/628
5,203,041 A * 4/1993 Alonso .................. A47C 17/82 5/420

(Continued)

FOREIGN PATENT DOCUMENTS

EP 3562456 B1 * 8/2022 ............... A61G 1/01
WO WO-2012080824 A1 * 6/2012 ............. A61G 1/013
WO WO-2018122594 A1 * 7/2018 ............... A61G 1/01

*Primary Examiner* — Robert G Santos
(74) *Attorney, Agent, or Firm* — ZarleyConley PLC

(57) ABSTRACT

A transport device having a layer of resilient material with ends and sides. A hook is attached to each end of the layer of resilient material and alternating rings and straps are attached along the sides. An adjustable strap is attached to one side of the resilient material at a first end of the strap and has a clip at the opposite end of the strap. Attached to a bottom surface of the layer of resilient material is a layer of plastic that is positioned inwardly of the ends and sides of the layer of resilient material.

11 Claims, 2 Drawing Sheets

(56) References Cited

U.S. PATENT DOCUMENTS

| | | | | | |
|---|---|---|---|---|---|
| 5,370,460 | A * | 12/1994 | Nelson | A45F 4/02 | 383/4 |
| 5,720,057 | A * | 2/1998 | Duncan | A61G 1/01 | 5/699 |
| 5,978,989 | A * | 11/1999 | Chavez | A61G 1/01 | 5/625 |
| 8,615,829 | B2 * | 12/2013 | Kenalty | A61G 1/02 | 5/628 |
| 10,932,963 | B2 * | 3/2021 | Kenalty | A61G 1/048 | |
| 11,744,749 | B2 * | 9/2023 | Kenalty | A61G 1/013 | 5/627 |
| 11,911,318 | B2 * | 2/2024 | Kenalty | A61G 1/044 | |
| 2012/0151679 | A1 * | 6/2012 | Kenalty | A61G 1/013 | 5/628 |
| 2016/0324700 | A1 * | 11/2016 | Kossoff | A61G 1/048 | |
| 2018/0177649 | A1 * | 6/2018 | Kenalty | A61G 1/013 | |
| 2021/0169713 | A1 * | 6/2021 | Kenalty | A61G 1/013 | |
| 2021/0177677 | A1 * | 6/2021 | Kenalty | A61G 1/048 | |
| 2022/0062073 | A1 * | 3/2022 | Kossoff | A62B 5/00 | |
| 2023/0363960 | A1 * | 11/2023 | Kossoff | A61G 1/044 | |

* cited by examiner

TRANSPORT DEVICE

CROSS REFERENCE TO RELATED APPLICATION

This application claims the benefit U.S. Provisional Patent Application Ser. No. 63/340,802 filed May 11, 2022, the contents of this application are hereby incorporated by reference in their entirety.

BACKGROUND

This invention is directed toward a transport device and more particularly to a device for transporting an individual quickly over difficult terrain.

Transport devices, such as a sked board, are known in the art. These devices are not designed for use in fire, military, or emergency situations where quick and safe removal from a dangerous situation is necessary. Further, these devices typically are not suitable for use with bariatric patients. Most of these devices are designed only for lifting an individual as opposed to dragging.

The job of a Rapid Intervention Crew (RIC) is to enter a structure and locate a downed firefighter and drag them out to safety. Currently, the process is extremely strenuous as a downed firefighter can weigh anywhere from 200 lbs. to 400 lbs. depending upon the firefighter's size and the gear they are wearing. There are also a number of issues for Emergency Medical Services (EMS), such as the need for a Long Back Board (LBB) and Lucas Device for use when securing a cardiac arrest victim. Typically, as the patient needs to be carried, the process cannot be performed while moving the patient to the ambulance. Other challenges come when bringing a vehicle accident victim up an embankment, or in transporting morbidly obese patients, especially when stairs are needed.

As an example, to transport a 625 lb. woman down three flights of stairs in an apartment building with no elevator, 8-10 firefighters would be required to lift and carry the woman down the stairs, creating risk of injury to both the firefighter and the woman. Another example includes moving a large patient from a back bedroom of a single-family residence that was considered a "hoarder house." As a result, there were small paths throughout the house with piles of trash and debris on both sides. As the patient was not ambulatory, the small paths made it difficult for a sufficient number of firefighters to lift the patient while still maneuvering around the trash and debris. Accordingly, a need exists in the art for a device that addresses these deficiencies.

An objective of the invention is to provide a transport device that can transport a heavy load with a minimum number of individuals.

Another objective of the present invention is to provide a transport device that reduces the risk of injury when transporting a heavy load.

These and other objectives will become apparent to one of ordinary skill in the art based on the following written description, drawings, and claims.

SUMMARY OF THE INVENTION

A transport device includes a layer of resilient material having ends and sides. A hook is attached to each end of the layer of resilient material and alternating rings and straps are attached along the sides. An adjustable strap is attached to one side of the layer of resilient material at one end of the strap and has a clip at the opposite end of the strap. Attached to a bottom surface of the layer of resilient material is a layer of plastic that is positioned inwardly of the ends and sides of the layer of resilient material.

The layer of resilient material, which in one example, is rectangular with angled corners and the ends of the layer of resilient material are symmetrical.

Attached at each end of the layer of resilient material is a strap that has a first Velcro strip that selectively aligns with a second Velcro strip on an opposite side of the strap. The straps along the sides are made of a continuous loop that extends across a bottom surface of the layer of resilient material and beyond the sides.

In one example the layer of plastic is made of a high-density polyethylene and is stitched to the layer of resilient material. A strip of material is attached to cover the stitching and is made of Kelvar.

DETAILED DESCRIPTION

Figure 1:
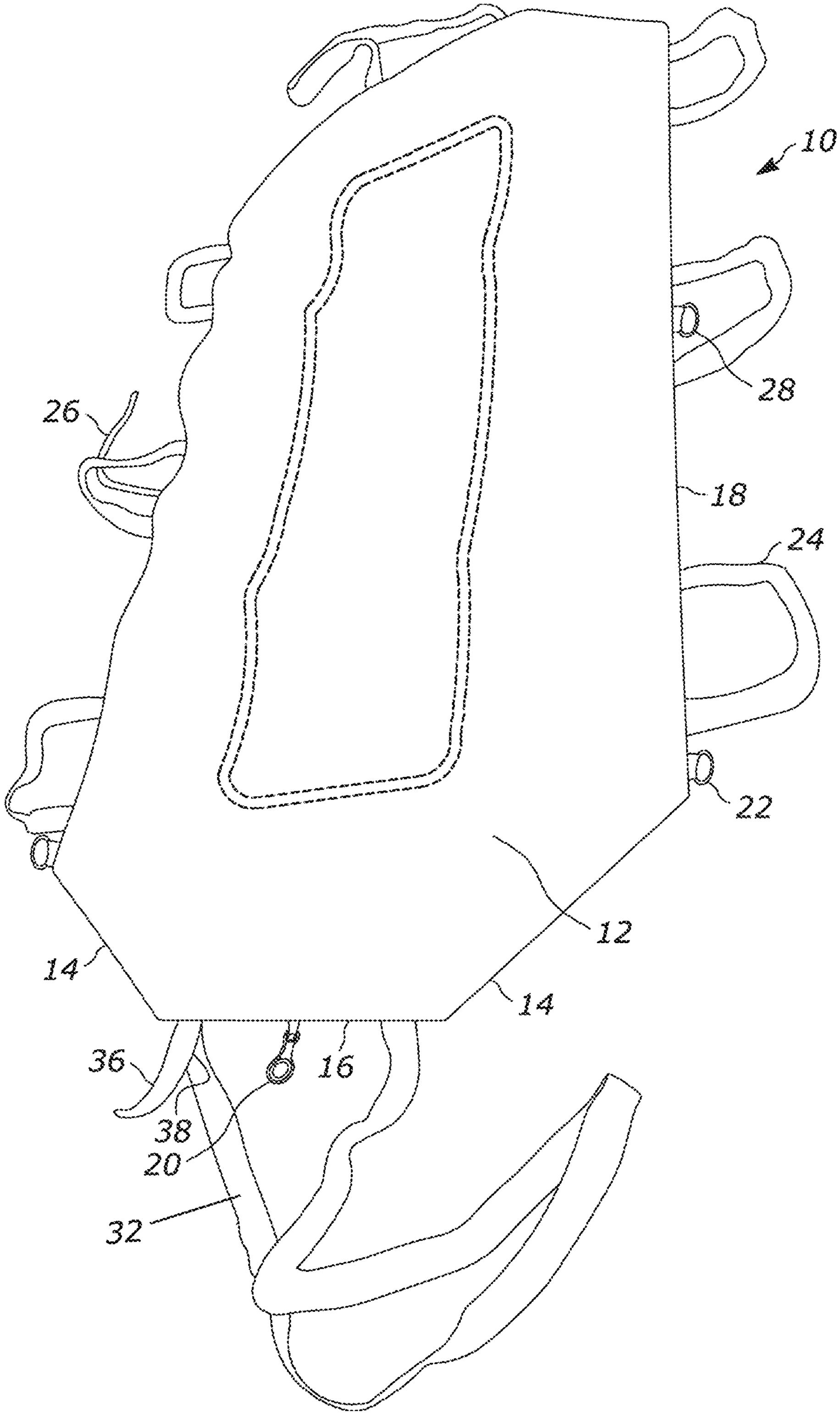
FIG. 1 is a top perspective view of a transport device.
Figure 2:
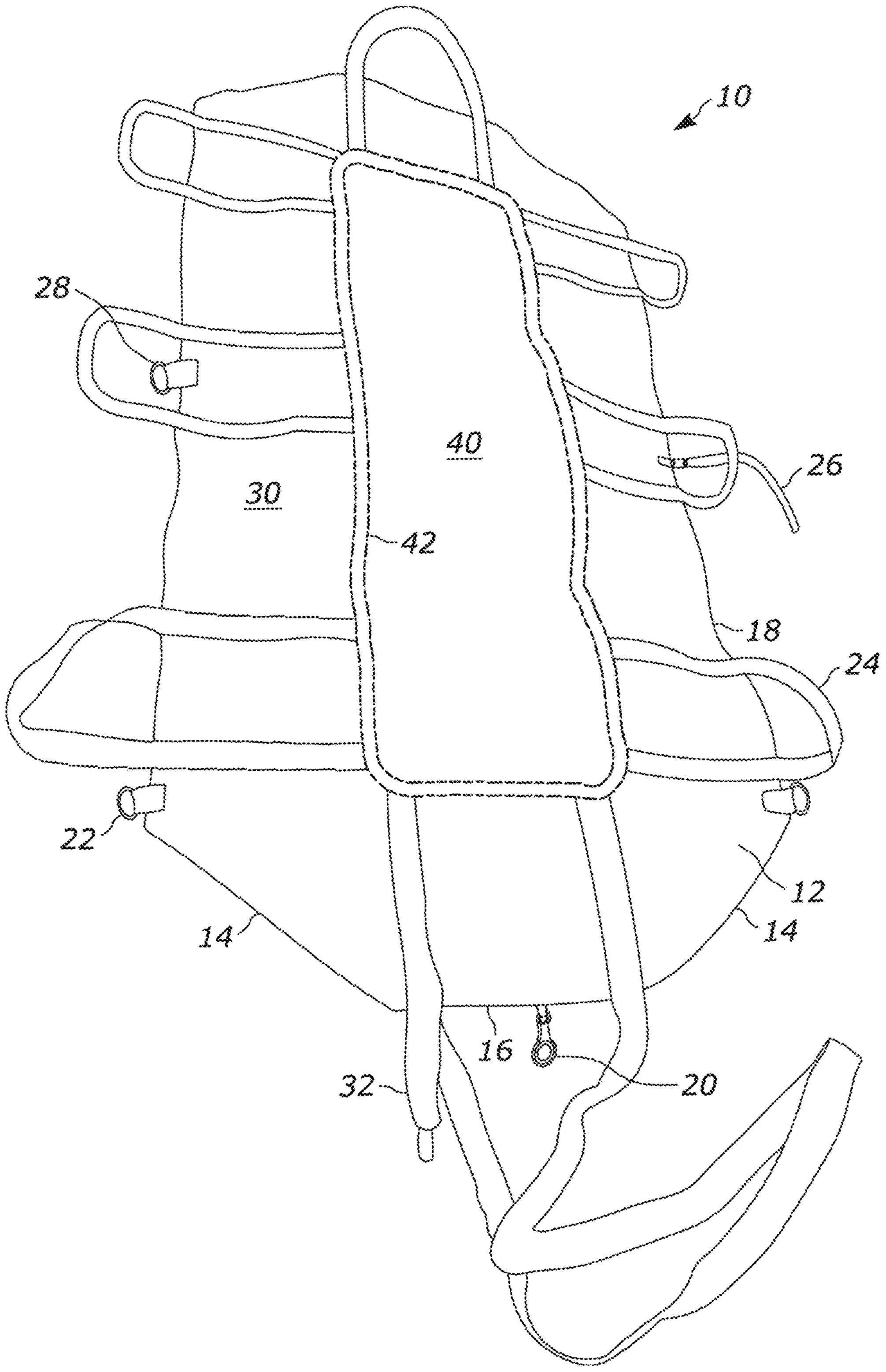
FIG. 2 is a bottom perspective view of a transport device.

Referring to the Figures, a transport device 10 has a layer of resilient material 12 that in one example is generally rectangular with angled corners 14. The layer of material 12 has ends 16 and sides 18. Attached to each end 16 is a hook or clip 20, and attached along the sides are alternating rings/clasps 22 and straps 24. In one example the hook/clip is easily connected to the rings/clasps 22 while wearing gloves, and in particular, fire or heat resistant gloves. An adjustable strap 26 is attached to one side 18 at one end and has a hook/clip 28 at the opposite end. The straps 24 are made of a continuous loop and extend across a bottom surface 30 of the material 12 and beyond the sides 18 so that they can be gripped by an individual for lifting. A strap 32 is attached at each end 16 of the material 12 and to form a loop that extends a length sufficient to allow one to drag the device up stairs without the need to bend over. The straps 32 have a Velcro strip 36 positioned to selectively align with a Velcro strip 38 on an opposite side of the strap 32. Both ends 16 of the device 10 are symmetrical so that during use the ends 16 are identical.

Attached to the bottom surface 30 of the material 12 is a layer of plastic 40 that permits the device 10 to be dragged over uneven or difficult terrain. In one example the layer of plastic is made of a high-density polyethylene. The layer of plastic 40 is positioned inwardly of the ends 16 and sides of material 12. In one example the layer of plastic 40 is stitched to the layer of material 12 and a strip of material 42 is attached to cover the stitching and prevent damage when the transport device is dragged. In one example, the strip of material 42 is of Kevlar.

In a storage position, the layer of fabric 12 and layer of plastic 40 are rolled up and straps 32 are connected to hold the device in a storage position. In use, the layer of material 12 and layer of plastic 40 are unrolled. A patient is placed on the upper surface 44 of the device 10. The clasps 22 adjacent the end 16 of the patient's feet are drawn together and are connected together by a hook 20 to form a pocket that receives and holds the patient's feet. Then, the adjustable strap 24 is pulled over the patient and connected to a clasp 22 on the opposite side 110 to hold the patient within the device. Once the patient is secured the device is either drug by grasping one or both of the straps 32 and/or lifted by grasping the plurality of handles 26 on the sides 18 of the device 10.

From the above discussion and accompanying figures and claims it will be appreciated that the transport device 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A transport device, comprising:

a layer of resilient material having ends and sides;

a hook attached to each end of the layer of resilient material;

alternating rings and straps attached along the sides;

an adjustable strap attached to one side adjacent to a strap and has a clip attached to the opposite side adjacent to another strap;

a layer of plastic attached to a bottom surface of the layer of resilient material that is positioned inwardly of the ends and sides of the layer of resilient material; and a strap attached at each end of the layer of resilient material that forms a loop of sufficient length to allow one to drag the transport device up stairs without the need to bend over;

wherein the straps attached at each end of the layer of resilient material have a first hook and loop type fastener strip, such as one sold under the Trademark of Velcro, that selectively aligns with a second hook and loop type fastener strip on an opposite side of the strap attached to each end of the resilient material;

wherein the straps are configured to connect to hold the transport device in a rolled up, storage position.

2. The transport device of claim 1 wherein the layer of resilient material is rectangular with angled corners.

3. The transport device of claim 1 wherein the ends of the layer of resilient material are symmetrical.

4. The transport device of claim 1 wherein the straps along the sides are made of a continuous loop that extends across the bottom surface of the layer of resilient material and beyond the sides.

5. The transport device of claim 1 wherein the layer of plastic is made of a high-density polyethylene.

6. The transport device of claim 1 wherein the layer of plastic is stitched to the layer of resilient material and a strip of material is attached to cover the stitching.

7. The transport device of claim 6 where the strip of material is made of a synthetic material, such as the one sold under the Trademark of Kelvar.

8. A transport device, comprising:

a layer of resilient material having a first end, a second end, a first elongated side, and a second elongated side;

a first hook attached to the first end and a second hook attached to the second end of the layer of resilient material;

a first plurality of clasps attached along the first elongated side and a second plurality of clasps attached along the second elongated side of the layer of resilient material;

the layer of resilient material having a pocket formed by connecting the first hook to one of the first plurality of clasps and one of the second plurality of clasps;

an adjustable strap attached to one of the first elongated side and the second elongated side and a clip attached to the other of the first elongated side and the second elongated side;

a first strap attached at the first end and attached to the second end of the layer of resilient material, wherein the first strap forms a first loop that extends from the first end and the second end, respectively;

the first loop having a first hook and loop fastener strip and a second hook and fastener strip that selectively align with one another;

a plurality of continuous loops connecting a bottom surface of the layer of resilient material, wherein the plurality of continuous loops extend beyond both the first elongated side and the second elongated side of the layer of resilient material;

a layer of plastic attached to the bottom surface of the layer of resilient material;

a strip of material attached to the bottom surface of the layer of resilient material such that the layer of plastic is between the strip of material and the layer of resilient material.

9. The transport device of claim 8 wherein the layer of resilient material is generally rectangular with angled corners.

10. The transport device of claim 9 wherein the first hook is configured for manipulation by heat resistant gloves.

11. The transport device of claim 10 wherein the layer of plastic is positioned inwardly from the first end, the second end, the first elongated side, and the second elongated side of the layer of resilient material.

* * * * *